Figures 1, 2:
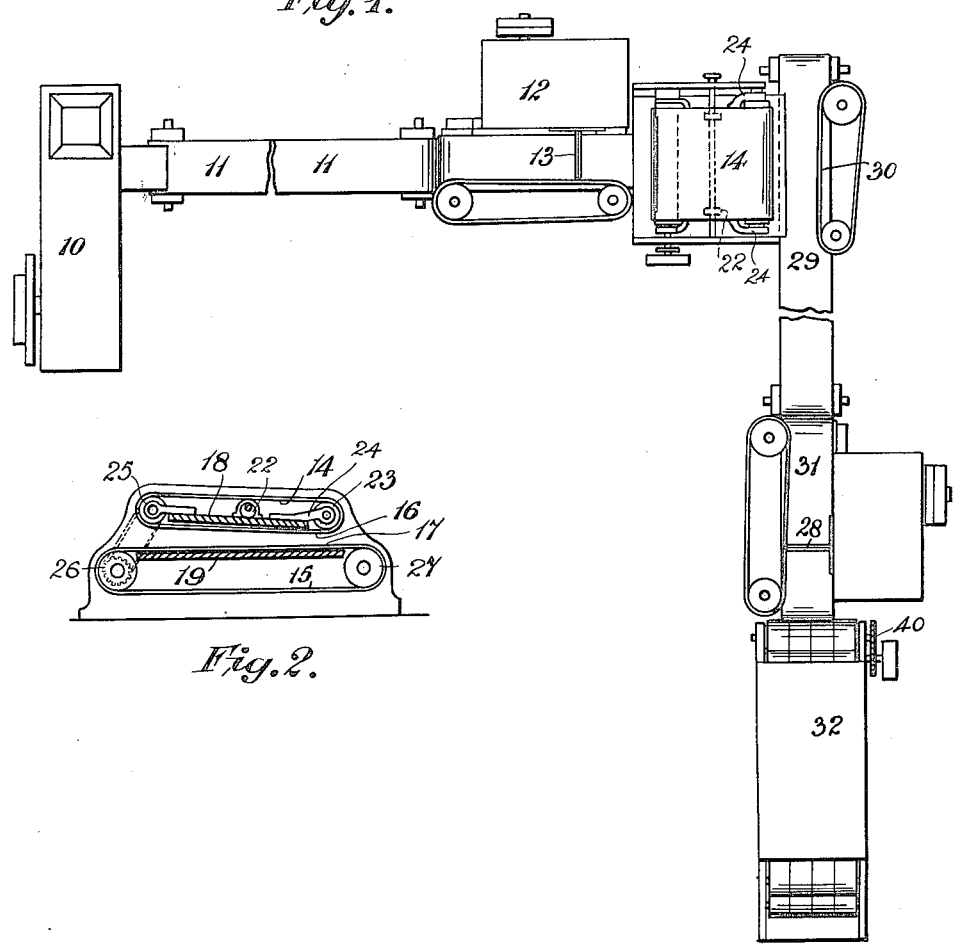

L. EMBREY.
DOUGH WORKING MACHINE.
APPLICATION FILED JULY 26, 1915.

1,169,472.

Patented Jan. 25, 1916.
4 SHEETS—SHEET 1.

Inventor
L. Embrey.

L. EMBREY.
DOUGH WORKING MACHINE.
APPLICATION FILED JULY 26, 1915.
1,169,472.
Patented Jan. 25, 1916.
4 SHEETS—SHEET 2.
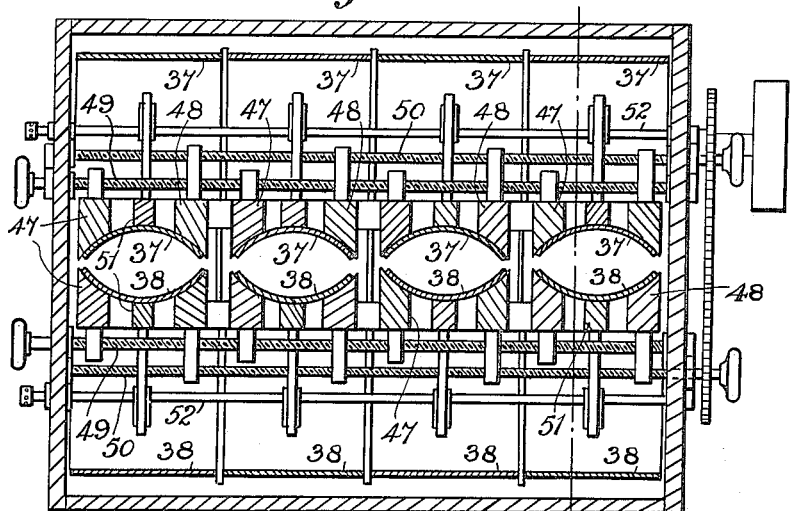
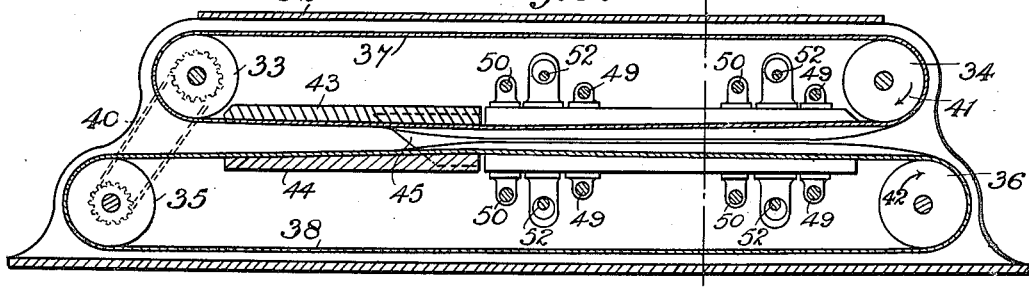
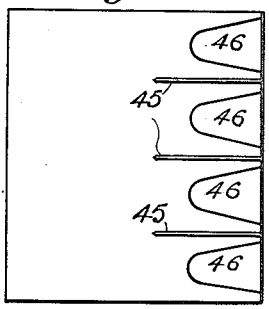
Inventor,
L. Embrey
Attorney.

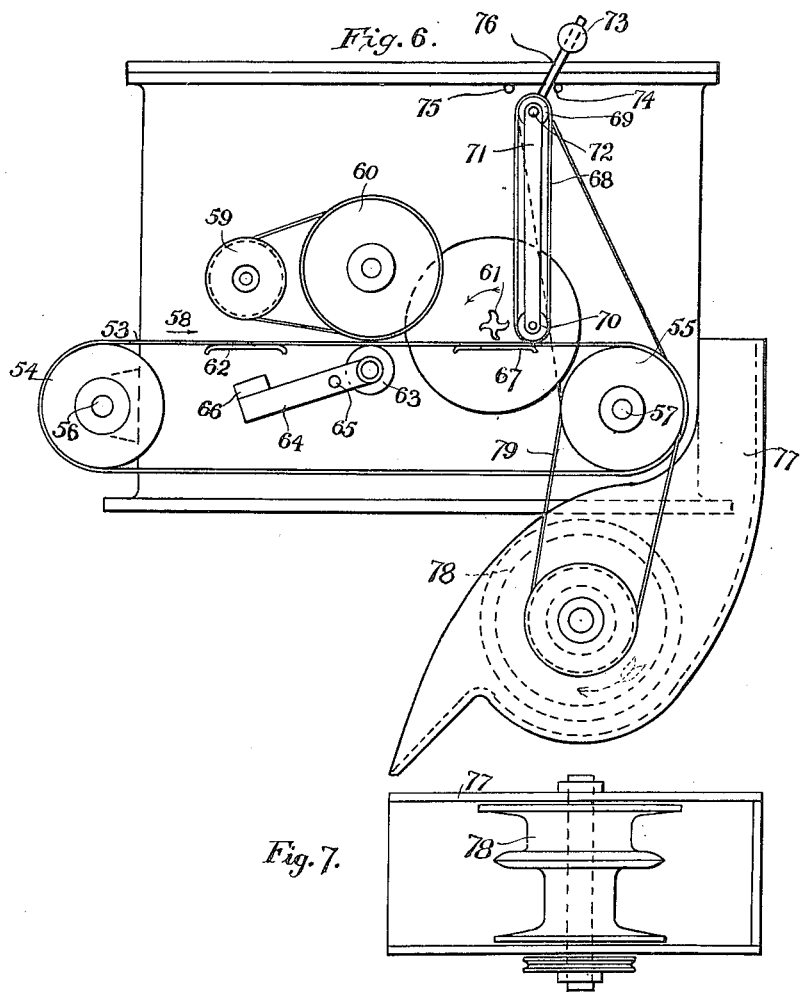

L. EMBREY.
DOUGH WORKING MACHINE.
APPLICATION FILED JULY 26, 1915.
1,169,472.
Patented Jan. 25, 1916.
4 SHEETS—SHEET 4.
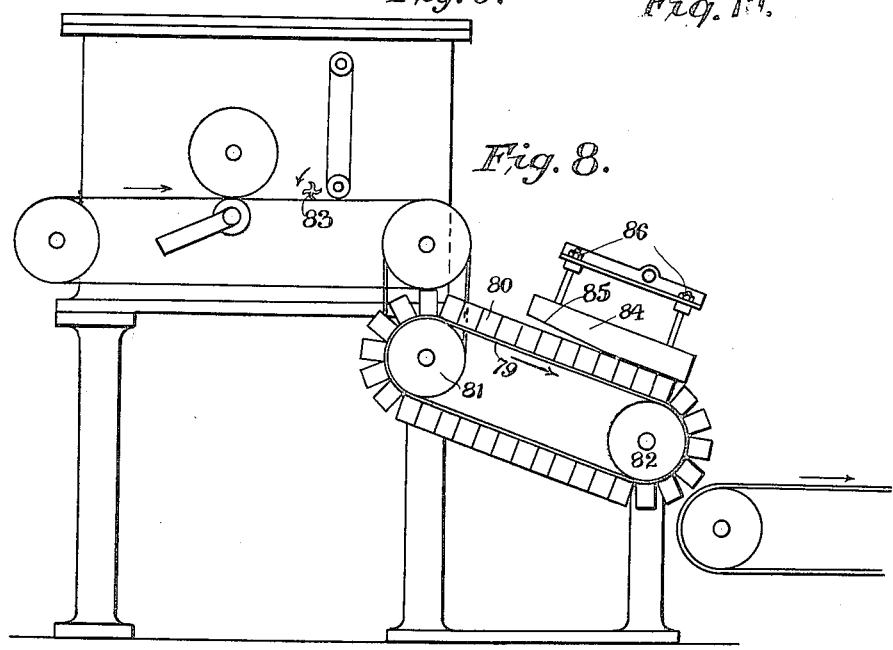

UNITED STATES PATENT OFFICE.

LAURENCE EMBREY, OF FENTON, STOKE-UPON-TRENT, ENGLAND.

DOUGH-WORKING MACHINE.

1,169,472.  Specification of Letters Patent.  Patented Jan. 25, 1916.

Application filed July 26, 1915. Serial No. 42,037.

*To all whom it may concern:*

Be it known that I, LAURENCE EMBREY, a subject of the King of Great Britain, residing at Fenton, Stoke-upon-Trent, in the county of Staffordshire, England, have invented certain new and useful Improvements in Dough-Working Machines, of which the following is a specification.

This invention relates to improved means for working dough to form loaves, rolls or the like.

The invention has reference to operations which I distinguish by the terms "molding" and "shaping." Hitherto these operations have not been strictly separated although it has been suggested and is in fact customary in many bakeries to "ball up" the lumps of dough from a divider, then give an interval of proving and subsequently mold.

I wish it to be understood that the terms "molding" and "shaping" used throughout this specification have a definite and separate meaning.

Molding consists in building up the lump of dough into a tight mass in which the gluten has been stretched. This operation is best performed by the process described in my United States application Serial No. 21225 filed 14th April, 1915.

Shaping consists in imparting to a mass of dough some desired shape or shapes. Shaping has thus no material or technological effect on the dough whereas the operation of molding, by working the gluten, does materially assist the process of proving and, as is well known in the bakery trade, improves the texture, color and bloom of the finished loaf in proportion to the thoroughness and skill with which the operation is carried out.

Hitherto the operations of molding and shaping have been carried on simultaneously and in fact in my prior application Serial No. 21225 mechanism is shown for carrying out these two operations simultaneously.

According to this invention the operations are carried out separately, the molding operation being performed first and the shaping being carried out subsequently thereto.

The operation of shaping may be accompanied by severance of the lump of dough into several pieces.

The object of the present invention is to provide means for molding and means for subsequently shaping the molded mass by a rolling movement.

The invention has further for its object the provision of suitable molding and shaping plants adapted to work in coöperation.

In the case of tin bread the shape is more or less imparted by the tin and consequently the present invention has more particular reference to such forms of bread as are baked on the oven bottom, generally known as oven bottom loaves, and dinner rolls, or those which are baked in shallow pans.

In the accompanying drawings: Figure 1 is a somewhat diagrammatic view of a plant suitable for molding and shaping dinner rolls. Fig. 2 is a side view of the extender or intermediate shaper. Fig. 3 is a longitudinal section of the shaping part of the mechanism. Fig. 4 shows a cross section to an enlarged scale of the apparatus shown in Fig. 3; the section is taken on the line 4—4 of Fig. 3. Fig. 5 is a plan view of one of the rigid backing boards. Fig. 6 is a side elevation of a modified form of shaping device. Fig. 7 is a plan of the shaping roll used in the device shown in Fig. 6. Fig. 8 is a side view of a shaper using shaping blocks. Figs. 9 and 10 show different sections of shaping blocks which may be used.

In the diagrammatic plan, Fig. 1, there is shown the general plant for handling or treating the dough in accordance with this invention. The dough is divided into lumps of a desired weight in a machine 10, called a dough divider or they may be scaled off by hand. The lumps of dough are then fed to the first molder 12, as for instance by a band 11. The lump of dough is here wound on a spindle 13 to form a coiled roll which is discharged from the molder in the manner described in the specification of my prior application Serial No. 21225. I have found it advantageous to extend this coil axially and to put this extended coil through a second molding operation by winding the coil in the "end-on" position on a second spindle. When it is understood that the function of molding is to stretch the gluten, the advantage of this second winding will be readily recognized. The first winding pulls the gluten of the dough out in one direction while the second winding pulls the gluten in a direction at right angles. If a long cloth or elastic band is pulled out in one direction it tends to contract and wrinkle in a direction at right angles to the line of stretch. The second winding and the intermediate axial extension of the coil tend to make the stretching action absolutely uniform throughout the whole mass of the dough.

The axial extension is conveniently performed by superposed conveyer bands 14 and 15, the adjacent parts or lengths 16 and 17 whereof move in opposite directions. The upper conveyer 14 moves at a slightly less linear speed than the lower and the axes of its rollers are not so far apart. As can be seen in Fig. 2 which is a side view of the extender or preliminary shaper, the space between the conveyers 14 and 15 diminishes in size from the inlet end to the discharge. Stationary backing boards 18 and 19 suitably adjustable by adjusting the rollers 23, 27, are provided for the conveyer bands. An eccentric 22 engaging in the backing board 18 may constitute the means for adjusting the spacing of the superposed bands. The roller 23 of the upper band is carried by suitable side lugs 24 on the backing plate or board 18 which is pivoted about the axis of the roller 25. A suitable frame supports the rollers 25, 26 and 27. Owing to the differential linear velocities of the conveyer bands 14 and 15, the molded coil of dough is caused to roll rapidly but only to progress at a rate proportional to the difference in velocities. The time of passage of the coil and the amount of coiling to which it is subjected are thus determined by the difference in the speeds of the two bands and the length of the gap between them. The coiled roll is reduced in diameter and extended in length while it progresses through or along the gap. This extension of the coil may be considered as a shaping operation which has no material effect on the dough, except to bring the dough into a form in which it will be more effectively treated by the second molding spindle 28. The operation may be considered as spreading the wrinkles apart to such a convenient distance that they can be stretched by the subsequent second molding operation.

From the extender or preliminary shaper the extended coils drop on to a conveyer 29 having a moving fender in the form of a side band 30, which retains the piece of dough in the center of the conveyer 29. From this conveyer the lumps or coils are passed to the second molding spindle 28 by a conveyer 31 which travels more quickly than the conveyer 29. The second molding spindle is also operated in the manner described in my prior application Serial No. 21225.

On leaving the spindle 28, the lump of dough is completely molded. The operations performed on the dough up to this point are purely molding operations with the exception of the coil extender or preliminary shaper which may be considered as auxiliary to the second molding operation. There now remains the duty of imparting to the molded clot or coil of dough the desired shape. This is effected in all cases by rolling the coil between shaping members. The shape imparted is thus always a surface of rotation.

As regards the actual shaping mechanism many forms may be adopted and a few have been illustrated in the drawings by way of example. I shall first of all describe the shaper illustrated in the general plan of Fig. 1. This shaper 32 is intended more specifically to shape a plurality of small rolls from the molded lump of dough. In the form shown four dinner rolls are divided and shaped from each lump of dough discharged from the molder.

Referring to Fig. 3 the shaping mechanism comprises a frame 32, supporting rollers 33, 34, 35 and 36. The rollers 33 and 34 are not so far apart as the rollers 35 and 36 and they are arranged higher in the frame. Around these rollers there pass a number of flexible bands 37 over the upper pair and 38 over the lower pair of rollers. In the form shown there are four bands over each pair of rollers. In some cases ridges 39 may be provided on the rollers to keep the bands separate. The two sets of bands form superposed conveyers and they are geared at 40 to run with their adjacent surfaces in opposite directions and the upper band runs more slowly than the lower band. The arrows 41 and 42 in Fig. 3 indicate the direction of motion of the two sets of bands, the arrow 42 also indicating the direction of travel of the dough along the space between the two bands. The bands 37 and 38 are at their adjacent oppositely moving faces suitably backed. At the entrance end the backing is shown as fixed stationary boards 43 and 44. The upper board 44 is provided at a short distance from the entrance side with fixed knives 45 spaced to come between the separate bands. In advance of this the boards or plates 43 and 44 are provided with grooves 46 which dip gradually into the boards directly over the bands 37 and under the bands 38 in the backing boards 43 and 44 respectively.

The grooves 46 may extend for any suitable length of the bands in advance of the knives. In the form shown they are short grooves and the backing boards terminate a short distance in advance of the knives to permit of the insertion of adjustable shaping bars. Three adjustable bars are provided under each band or strip. The side bars 47 and 48 are adjustable laterally and the center bars 51 are adjustable vertically. All the left hand bars 47 are mounted on screws 49 while all the right hand bars 48 are mounted on screws 50. The center bars 51 may be adjusted vertically and simultaneously by eccentrics mounted on bars 52.

In the part of the mechanism just described the dough already built up or molded has the desired shape imparted to it by a rolling action. It is necessary to roll during shaping and the mechanism described is that best suited to the work. The essentials are the moving superposed bands, of which the lower travels faster than the upper, and the amount of rolling applied to the pieces of dough depends upon the length of the gap between the two conveyers and the difference in speed of the bands.

According to the form shown in Fig. 6, the dough is molded in a machine such as described in the specification of my application Serial No. 21225. The mechanism is contained in a box and this mechanism drives the parts shown in Fig. 6 in the required manner. A conveyer band 53 stretched over drums 54 and 55 mounted on spindles 56 and 57 moves in the direction of the arrow 58. This movement of the band carries the clot of dough first under a roller 59 and then under a roller 60, so as to form a strip which is coiled on a spindle 61. The roller 59 has a counter pressure surface 62, while the roller 60 has a counter pressure roller 63, which is pivotally mounted on the arm 64 having its pivot at 65 and weighted at 66. A counter pressure plate 67 is arranged under the spindle 61. The spindle rotates in the direction of the arrow. A small conveyer 68 is provided which is stretched over rollers 69 and 70. This conveyer laps the strip of dough from the band 53 on to the winding spindle 61. The conveyer 68 is mounted on an arm 71 pivoted at 72 and counter weighted at 73. This conveyer can swing between the stops 74 and 75 which co-act with the arm 76 carrying the weight 73. Suitable mechanism inside the box returns the conveyer at the proper time to lap the next strip of dough on to the spindle. When a strip of dough has been coiled for the requisite amount or number of twists the spindle is withdrawn within the box and the coil of dough passes on with the conveyer band 53 under the counterbalanced conveyer 68. This coil of dough then falls into a trough 77. The trough 77 is arranged below the molding machine and is conveniently curved as shown. Mounted in the trough 77 there is a roller 78 which may be driven by a belt or rope 79 from the drum 55. In Fig. 7 the approximate shape of the roller 78 for shaping a cottage loaf is given. This roller rotates in the direction of the arrow marked thereon and thereby causes the coil of dough to roll forward underneath it and between it and the curved walls of the trough 77.

In carrying the invention into effect according to the form shown in Fig. 8 the movable shaping member is in the form of a conveyer 79 having a number of blocks of wood 80 or the like fixed thereto. The conveyer 79 is mounted on drums 81 and 82. The spindle 83 may be arranged above the conveyer and operated in the manner described in specification of application Serial No. 21225. After the coil leaves the spindle 83 it has been molded or built up. It then passes to the shaper proper 79 where it is given a shape corresponding to the shape of the blocks. This is by virtue of the fact that the blocks 80 have grooves in them as shown in Fig. 9, or at 80ª, Fig. 10. On leaving the spindle 83 the lump of dough is carried forward by the conveyer blocks under an inverted fixed shaping trough 84 which has grooves on its underside as shown in Figs. 9 or 10. The trough may be arranged with its lower edges 85 inclined to the upper surface of the conveyer 79 so that the shaping is gradual. A convenient proportion for this inclination of tapering of the trough or band is indicated in the drawing. Adjustment of the height of the trough 84 may be effected by operating the nuts 86.

Fig. 9 shows the shape of the trough 84 and blocks 80 for a cottage loaf. In Fig. 10 the approximate shape for a "coburg" loaf is given.

The method and means for working dough herein described have the effect of stretching the gluten from within the mass in two directions by the internal operation of the winding spindles. This stretching has the effect of producing bread of a good color and texture as the cell walls are uniformly thin throughout the bread when baked. The bread in practice is found to retain its moisture and remain fresh for a longer period. It is also found that with flours which do not under ordinary treatment yield a good white bread, it is possible to obtain bread of a beautiful white color and texture.

The rolling operation of shaping proves most effective in giving a tight smooth outer skin and the means for dividing during shaping has proved to give remarkably accurate results in the case of small loaves or rolls.

I claim:—

1. Apparatus for working dough having means operable within the mass of a lump of dough for molding said dough by stretching the gluten thereof and means for subsequently imparting shape to said molded lump of dough.

2. Apparatus for working dough having a rotary spindle for molding a lump of dough by coiling the dough under tension thereon, a second rotary spindle, and means for delivering the coiled roll from the first spindle in "end-on" position to the second spindle.

3. Apparatus for working dough having a rotary spindle for molding a lump of dough by coiling the dough under tension thereon, means for extending the coiled roll axially, a second rotary spindle and means for feeding said extended roll in the "end-on" position to said second roll.

4. Means for shaping a molded piece of dough comprising a plurality of superposed pairs of continuous strips, dividing knives located to operate between said pairs of strips and means for driving the upper set of strips at a lesser speed than the lower set.

5. Means for shaping a molded piece of dough comprising a plurality of superposed pairs of flexible bands having their adjacent faces moving in opposite directions and spaced apart, a plurality of shaped backing bars for the adjacent faces of each of the bands, means for adjusting said bars and means for driving said bands at different circumferential speeds.

6. Means for shaping a molded piece of dough comprising a plurality of superposed pairs of flexible bands, having their adjacent faces spaced apart and a plurality of adjustable backings for each of said adjacent faces, said backings forming between them shaping grooves in which the flexible bands run.

7. Means for shaping a molded piece of dough comprising a pair of superposed flexible bands having their adjacent faces spaced apart, and a plurality of adjustable backings for each of said adjacent faces, said backings forming between them shaping grooves in which the flexible bands run.

8. Means for shaping a molded piece of dough, including two molding surfaces, one of said surfaces comprising a flexible band, a plurality of backings for said band to form a shaping groove, and means for individually adjusting the backings.

In testimony whereof I have signed my name to this specification in the presence of two subscribing witnesses.

LAURENCE EMBREY.

Witnesses:
 VINCENT FLACKETT,
 FRANK MADSLEY.